G. N. PALMER.
Cooking-Stoves.
No. 6,139. Reissued Nov. 17, 1874.
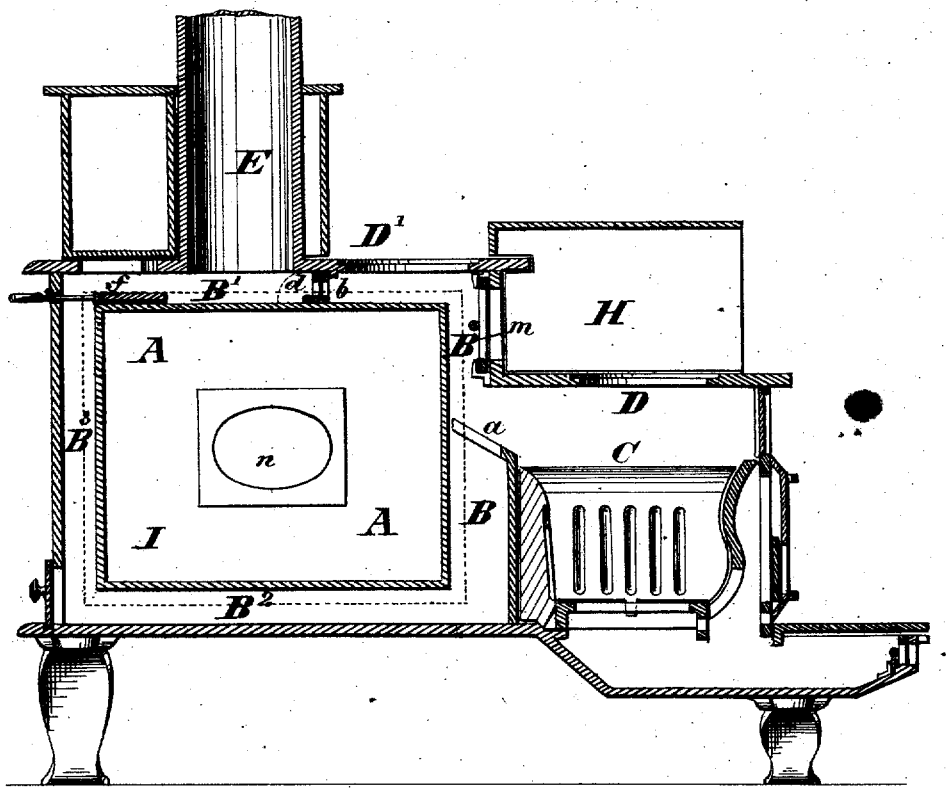
WITNESSES
Jas L. Ewin
Henry Tanner
INVENTOR
George N. Palmer
By Knight Bros Attorneys.
THE GRAPHIC CO. PHOTO-LITH. 39 & 41 PARK PLACE, N.Y.

UNITED STATES PATENT OFFICE.

GEORGE N. PALMER, OF ELMIRA, NEW YORK.

IMPROVEMENT IN COOKING-STOVES.

Specification forming part of Letters Patent No. 150,781, dated May 12, 1874; reissue No. 6,139, dated November 17, 1874; application filed July 23, 1874.

*To all whom it may concern:*

Be it known that I, GEORGE N. PALMER, of Elmira, in the county of Chemung and State of New York, have invented a new and useful Improvement in Cooking-Stoves, of which the following is a specification:

My invention relates to the class known as step-stoves in which the top of the oven is on a higher level than the top of the fire-box.

My improvements consist, first, in locating the top of the fire-box at or near the mid-height of the oven and combining with the said oven flues, surrounding the same, and provided with independent dampers, one regulating the upward draft at the front of the oven, and the other the draft downward around the back of the oven, the said dampers being located at points remote from that at which the products of combustion from the fire-box come in contact with the front plate of the oven. The object of this part of my invention is to utilize the full heating effect of the products of combustion immediately on leaving the fire-box, and cause them to impart heat as uniformly as possible to the various parts of the oven.

My improvements relate, secondly, to the construction of the damper which regulates the upward or direct drafts, said damper being perforated and provided with a register, which permits sufficient circulation to prevent the formation of a dead-chamber, and the consequent escape of gas from the upper flues, while it enables the throwing of nearly all the products of combustion into the lower circulation beneath the oven, when required.

My improvements relate, thirdly, to the combination of the dampers, as hereinafter described.

My improvements relate, fourthly, to the combination, with a fire-box and oven-flues, arranged in manner substantially as first indicated, of a register, adapted to admit external air to the oven-flues in order to regulate the draft without subjecting the incandescent fuel to the direct action of cold air.

The accompanying drawing is a vertical longitudinal section of a stove illustrating my invention.

A represents the oven of the stove; B, the front flue thereof; $B^1$, the top flue; $B^2$, the bottom flue; and $B^3$, the rear or back flue. These flues are connected completely around the oven, and all extend laterally the entire width of the stove, having no divisions or partitions such as are usually employed with diving-flues. C represents the fire box or chamber, the grate of which may be at or near the level of the bottom flue $B^2$, while the ash-pit extends to a lower level, as represented. These relative positions of grate, ash-pit, and bottom flue are not, however, essential to my invention. The top of the fire-box is located, as shown, at or near the midheight of the front flue B, so that the gaseous products of combustion immediately on leaving the fire-box are brought in contact with the central part of the main oven-plate, striking the said plate nearly at right angles to its surface, which causes them to be diffused uniformly over the surface of the plate, and permits their easy and free deflection and separation in an upward and downward direction, a part going to the upper flue $B^1$ and a part to the lower flue $B^2$, in proportions regulated by dampers presently to be described. *a* represents an inclined grating to prevent the falling of coal into the front flue B. D is the top plate of the front portion of the stove. D′ is the top plate of the rear portion. E is the discharge flue or pipe. In the upper flue $B^1$, in front of, and in close proximity to, the discharge-pipe E, is a perforated hinged damper, *b*, extending the entire width of the flue, and provided with a slide or register, *d*, for opening and closing the perforations in the damper, so as to regulate the passage of the gases through the front portion of the upper flue, or to admit of nearly closing such passage when required. The hinging of the damper enables it to be let down, when required, so as to leave the flue B entirely unobstructed when a direct draft is required.

When the damper is elevated as shown in the drawing I am enabled, by means of the slide or register *d*, to cause an equal passage of gases above and below the oven, or to regulate the relative flow above and below, as may be desirable.

*f* is a sliding damper, by which the top of the rear flue $B^3$ may be closed when required, leaving the entire draft of the stove under the control of the damper *b* and register *d*, and of a cold-air register, *m*, which is located, as shown, in the front plate of the flue B above the top D of the fire-box, and serves to check the draft when required without the necessity of confining the gases, and also without exposing the incandescent fuel to the effect of cold air.

This device enables me to keep the fuel in a state of lively incandescence, while its combustion may be checked to any desirable extent, and for any necessary period.

H represents a hood partially covering the top plate D, and serving to confine vapors or gases, so as to cause them to be carried through the register *m* into the flues.

It will be noticed that my stove is of class known as the step-stove; also, that the flues B $B^1$ $B^2$ $B^3$ extend the entire width of the stove, and have no divisions as diving-flue stoves; also, that this stove, in the relative positions of the oven, the fire-box, and the flues, possesses all the advantages, while avoiding the disadvantages, of diving-flue stoves; also, that, by means of the dampers *b* and *f*, the products of combustion can be thrown at will either all above or below, or equally divided above and below the oven.

The close proximity of the oven to the fire-box enables an economical use of coal; also, the direct application of the products of combustion to the oven, and the superior draft of the stove, enable the employment of a slower and lower state of combustion.

The damper *m* allows a check on the fire, and at the same time gives no chance for escape of the noxious gases; and also the position of the damper prevents the cold air from striking on top of the burning surface, and so obviates the blackening which takes place in case of a lid being raised.

The direct application of heat enables the effective heating of the oven without so high a state of combustion of the fuel.

Diffusion of heat renders the heating uniform, and prevents it from becoming excessive at any point.

The following is claimed as new:

1. The combination of the following elements, to wit: The oven A, surrounded with flues B $B^1$ $B^2$ $B^3$ extending from side to side without interruption, the fire-box C located, as shown, and delivering its gases at about the mid-height of the oven, the independent dampers *b* and *f*, the former having a register, *d*, to accurately graduate the draft through the direct flue and the discharge-flue E, all constructed and operating as specified.

2. The combination of the fire-box C, the flues B $B^1$, the registered damper *b d* for accurately graduating the draft through said flues, and the register *m* for permitting an active draft through the flues B $B^1$ without causing a draft through the fire, all substantially as specified.

3. The hinged perforated damper *b*, provided with the slide *d*, and arranged in the top flue $B^1$, for the purpose of more thoroughly regulating the amount of heat in its passage around the oven, substantially as herein set forth.

GEORGE N. PALMER.

Witnesses:
J. R. REID,
OCTAVIUS KNIGHT.